(12) United States Patent
Wong et al.

(10) Patent No.: US 9,112,688 B2
(45) Date of Patent: Aug. 18, 2015

(54) RELAY WITHIN SINGLE USER, MULTIPLE USER, MULTIPLE ACCESS, AND/OR MIMO WIRELESS COMMUNICATIONS

(71) Applicant: BROADCOM CORPORATION, Irvine, CA (US)

(72) Inventors: Chiu Ngok Eric Wong, San Jose, CA (US); Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 222 days.

(21) Appl. No.: 13/930,458

(22) Filed: Jun. 28, 2013

(65) Prior Publication Data
US 2014/0119271 A1  May 1, 2014

Related U.S. Application Data

(60) Provisional application No. 61/720,770, filed on Oct. 31, 2012, provisional application No. 61/766,795, filed on Feb. 20, 2013, provisional application No. 61/814,945, filed on Apr. 23, 2013, provisional application No. 61/819,238, filed on May 3, 2013, provisional application No. 61/822,504, filed on May 13, 2013, provisional application No. 61/822,510, filed on May 13, 2013.

(51) Int. Cl.
| | | |
|---|---|---|
| H04J 3/24 | (2006.01) | |
| H04L 1/18 | (2006.01) | |
| H04W 84/04 | (2009.01) | |
| H04W 74/00 | (2009.01) | |

(52) U.S. Cl.
CPC ............... *H04L 1/18* (2013.01); *H04W 74/002* (2013.01); *H04W 84/047* (2013.01)

(58) Field of Classification Search
USPC .......................... 370/315, 389, 432, 471, 474
See application file for complete search history.

(56) References Cited

U.S. PATENT DOCUMENTS

| | | | |
|---|---|---|---|
| 7,756,162 B2 * | 7/2010 | Adachi et al. ................. | 370/501 |
| 2009/0010199 A1 * | 1/2009 | Adachi et al. ................. | 370/315 |
| 2013/0003689 A1 * | 1/2013 | Kwon et al. ................... | 370/329 |

* cited by examiner

*Primary Examiner* — Phuc Tran
(74) *Attorney, Agent, or Firm* — Garlick & Markison; Shayne X. Short

(57) ABSTRACT

A relay receives a frame from a source, and based on state of a relayed frame bit within the frame, the relay selects an operational mode: implicit acknowledgement mode, first explicit acknowledgement mode, or second explicit acknowledgement mode. The relay sets the relayed frame bit in subsequent transmissions to indicate transmission opportunity (TXOP) control of the communication medium (e.g., whether under control of the relay or the source). The source may receive acknowledgement of the relay's successful receipt of the frame implicitly via the relay transmitting a relayed frame to the destination. Alternatively, the source may receive acknowledgement of the relay's successful receipt of the frame explicitly in a response frame from the relay. State of a more data bit in the frame receive from the source may indicate the source has one or more additional frames intended for the destination.

20 Claims, 10 Drawing Sheets

• Frame Control (FC) field in short MAC header

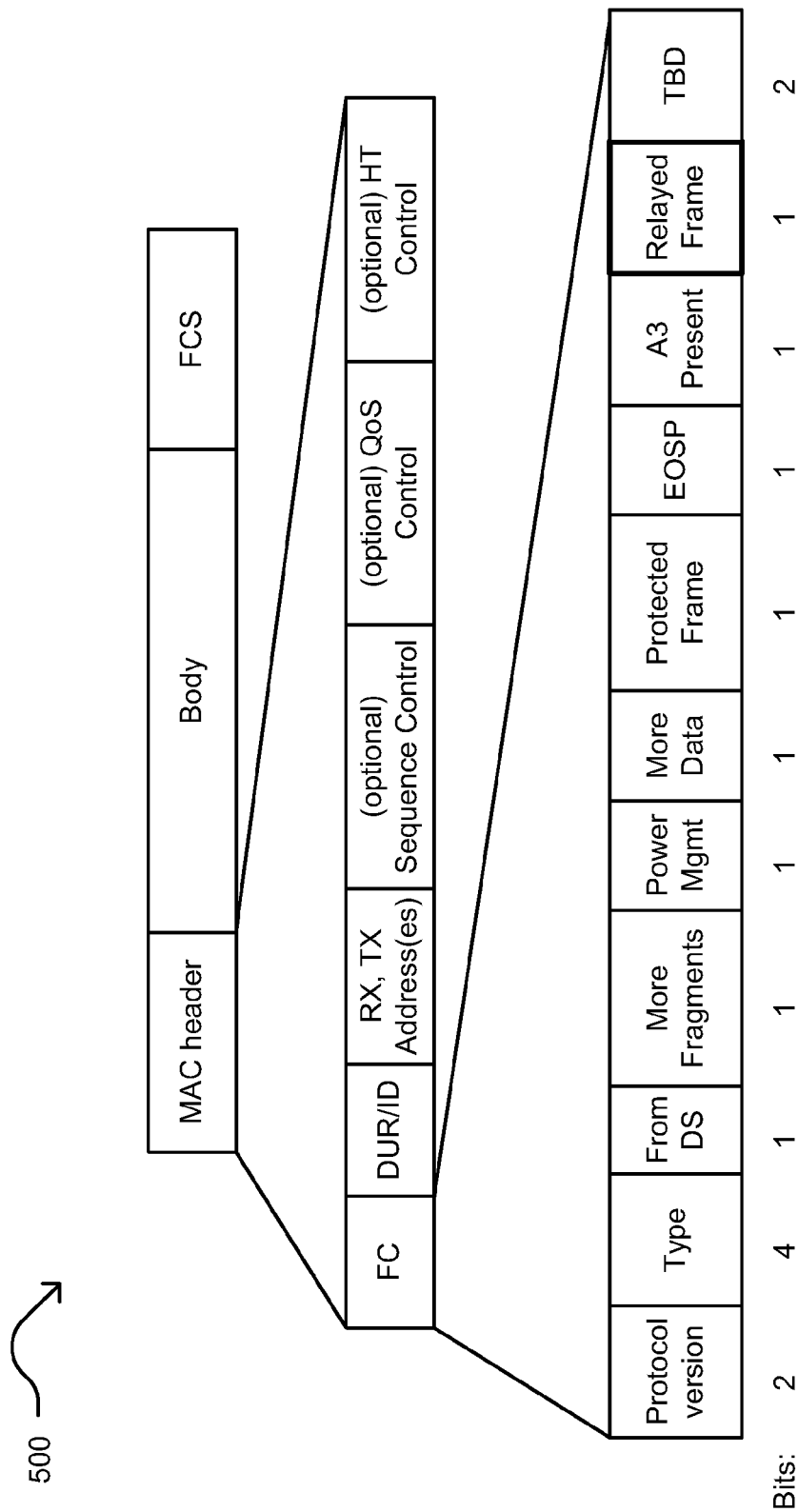
FIG. 5 • Frame Control (FC) field in short MAC header

US 9,112,688 B2

RELAY WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Prov. Patent App. Ser. No. 61/720,770, entitled "Relay within single user, multiple user, multiple access, and/or MIMO wireless communications," filed Oct. 31, 2012, pending.

2. U.S. Prov. Patent App. Ser. No. 61/766,795, entitled "Relay within single user, multiple user, multiple access, and/or MIMO wireless communications," filed Feb. 20, 2013, pending.

3. U.S. Prov. Patent App. Ser. No. 61/814,945, entitled "Relay within single user, multiple user, multiple access, and/or MIMO wireless communications," filed Apr. 23, 2013, pending.

4. U.S. Prov. Patent App. Ser. No. 61/819,238, entitled "Relay within single user, multiple user, multiple access, and/or MIMO wireless communications," filed May 3, 2013, pending.

5. U.S. Prov. Patent App. Ser. No. 61/822,504, entitled "Relay within single user, multiple user, multiple access, and/or MIMO wireless communications," filed May 13, 2013, pending.

6. U.S. Prov. Patent App. Ser. No. 61/822,510, entitled "Buffer relay management within single user, multiple user, multiple access, and/or MIMO wireless communications," filed May 13, 2013, pending.

BACKGROUND

1. Technical Field

The present disclosure relates generally to communication systems; and, more particularly, to relaying within single user, multiple user, multiple access, and/or MIMO wireless communications.

2. Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into RF signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Within such wireless communication systems, large distances between devices may cause problems and degrade communication performance. For example, fading and other undesired effects might reduce performance and the efficacy of communication between devices as the distance between them increases.

BRIEF DESCRIPTION OF THE SEVERAL VIEWS OF THE DRAWINGS

FIG. 5 is a diagram illustrating an embodiment of a frame being communicated between wireless communication devices for relay transmission opportunity (TXOP).

DETAILED DESCRIPTION

Figure 1:
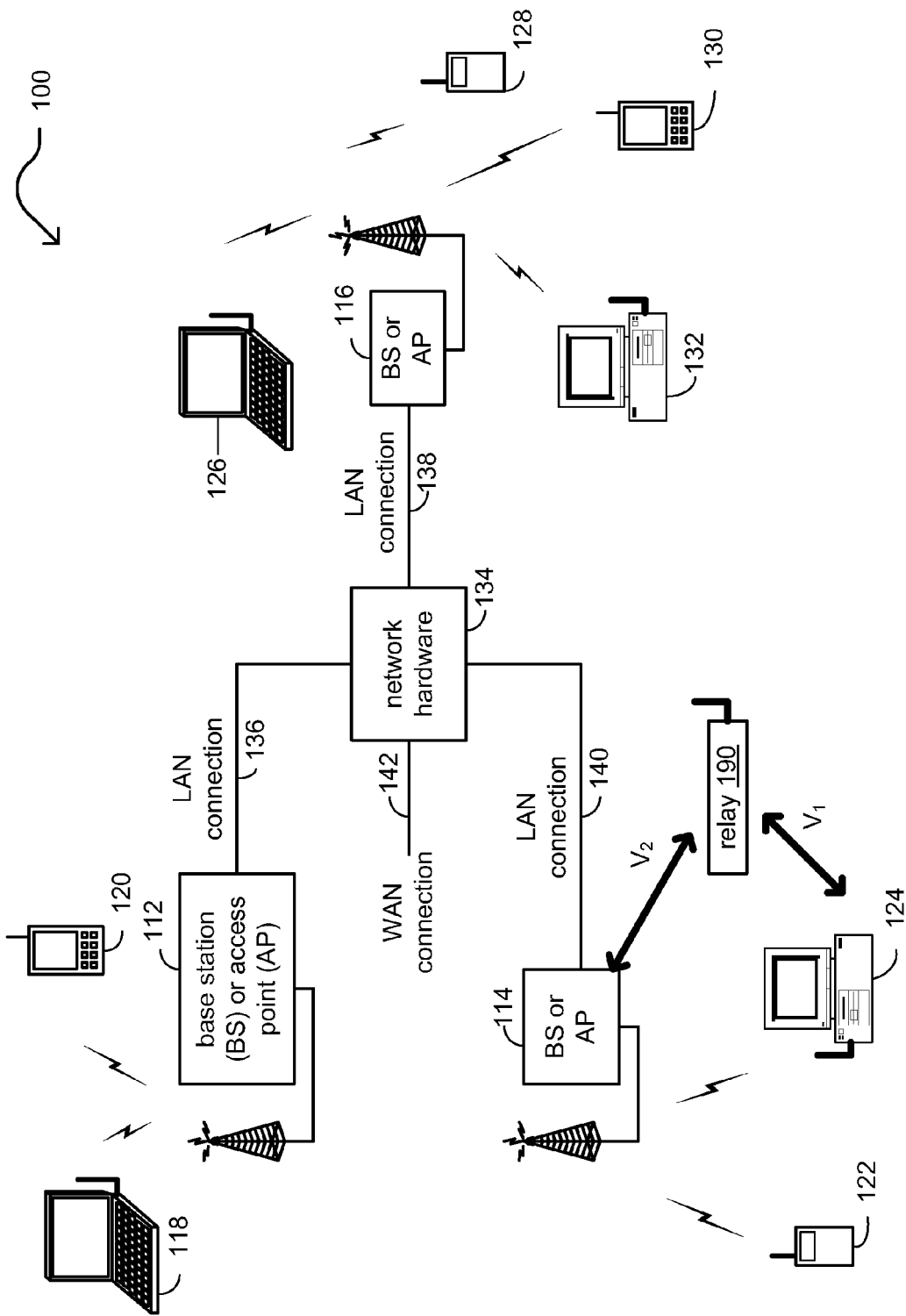
FIG. 1 is a diagram illustrating one or more embodiments of a wireless communication system.

FIG. 1 is a diagram illustrating one or more embodiments of a wireless communication system 100. The wireless communication system 100 includes base stations and/or access points 112-116, wireless communication devices 118-132 (e.g., wireless stations (STAs)), wireless relay communication device 190, and a network hardware component 134. The wireless communication devices 118-132 may be laptop computers, or tablets, 118 and 126, personal digital assistant 120 and 130, personal computer 124 and 132 and/or cellular telephone 122 and 128. The wireless relay communication device 190 may be a stand-alone wireless communication device or functionality included in one or more of the other wireless communication devices shown herein. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

For various reasons, communication between the various devices (BSs/APs or STAs) may be adversely affected due to fading, distance, interference, weak/inefficient communication link, etc. and/or other impairments. A relay, such as wireless relay communication device 190, can supports communications between two other devices (e.g., an AP and a STA). Considering an example of operation, relay wireless communication device 190 can serve to support communications between personal computer (PC) 124 and BS/AP 114. The relaying may be in either direction such that either PC 124 or BS/AP 114 operates as a source wireless communication device, and the other operates as a destination wireless communication device. As seen in the diagram, relay 190 receives a frame from the PC 124 (hop $V_1$), and the relay 190 generates and transmits a relayed frame to the BS/AP 114 (hop $V_2$).

For brevity, source, relay, and destination (or source device, relay device, and destination device, or other such equivalents) may be used instead of source wireless communication device, relay wireless communication device, and destination wireless communication device. The source generates a frame for the destination, and sets one or more bits in the frame to indicate the manner by which the relay may operate. A relayed frame bit (e.g., first frame bit) set in the frame transmitted from the source indicates the source has implicit acknowledgement capability. In an implicit acknowledgement mode, the source passes responsibility to the relay to forward data within the frame to the destination, and the source does not require a separate acknowledgement from the relay. In this implicit acknowledgement mode, the source receives acknowledgement implicitly by the relay's transmission of the relayed frame. Also, a more data bit (e.g., second frame bit) may be set to indicate either one of two possible explicit acknowledgement modes when the relayed frame bit is not set.

In a first explicit acknowledgement mode, the relay provides a response frame (e.g., acknowledgement (ACK), block acknowledgement (ACK), etc.) to the source that also indicates the relay also has control of transmission opportunity (TXOP) in the communication system. As such, during a following time period of the TXOP, neither the source nor the destination makes any transmission, and the relay transmits the response frame to the source, followed by the relayed frame to the destination. The reader will understand TXOP in wireless local area network (WLAN) related communications including as defined in various communication standards, protocols, and/or recommended practices (including those currently under development) such as those in accordance with IEEE 802.11x (e.g., where x is a, b, g, n, ac, ad, ae, af, ah, etc.). In a second explicit acknowledgement mode, the relay provides a response frame to the source that indicates the source also has control of TXOP. In this mode, the relay transmits relayed frame to the destination later, such as after one or more additional frame are received from the source.

Referring to the diagram, relay 190 receives a frame from a source (PC 124 or BS/AP 114), interprets one or more of the frame's bit values and selectively operates in a selected mode. The relay operates in an implicit acknowledgement mode, a first explicit acknowledgement mode, or second explicit acknowledgement mode. In the implicit acknowledgement mode, the relay transmits a relayed frame to the destination (e.g., if source is PC 124, then destination is BS/AP 114, or vice versa), and the source receives acknowledgement implicitly by the relay's transmission of the relayed frame. In the first explicit acknowledgement mode, the relay provides a response frame to the source that indicates the relay also has control of TXOP. In the second explicit acknowledgement mode, the relay provides a response frame to the source, and the source has control of TXOP.

It is also noted that any other wireless communication device in the diagram may serve as a relay between two other wireless communication devices (e.g., between STA and BS/AP, between two STAs, between two BSs/APs, etc.). As one example, cellular telephone 122 may serve as a relay between PC 124 and BS/AP 114. As another example, wireless communication device 118 may serve as a relay between personal digital assistant 120 and BS/AP 112. Generally, any one wireless communication device may serve as a relay between any two other wireless communication devices.

Figure 2:
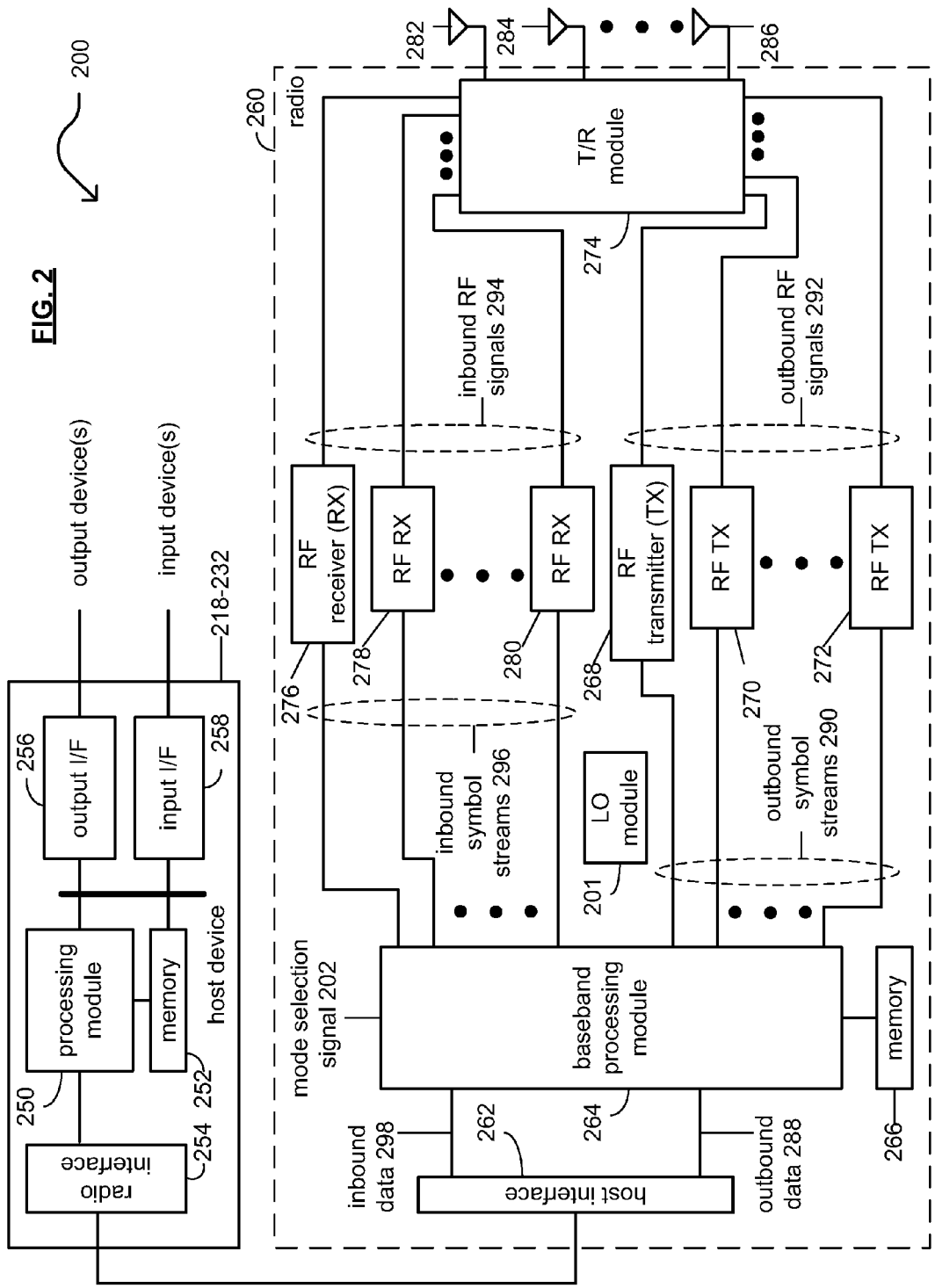
FIG. 2 is a diagram illustrating one or more embodiments of a wireless communication device.

FIG. 2 is a diagram illustrating one or more embodiments of a wireless communication device 200. The embodiment of a wireless communication device 200 includes any one of devices 218-232 and an associated radio 260. In some embodiments, one or more of the devices 218-232 may be implemented as one or more of the wireless communication devices 118-132. For cellular telephone, the radio 260 is a built-in component. For personal digital assistants, laptop and/or personal computers, the radio 260 may be built-in or an externally coupled component. For access points or base stations, the components are typically housed in a single structure. Each of devices 218-232 includes a processing module 250, memory 252, radio interface 254, input interface 258 and output interface 256. Processing module 250 and memory 252 execute corresponding instructions typically done by the device. For example, for a cellular telephone, the processing module 250 performs the corresponding communication functions in accordance with a particular cellular telephone standard.

The radio interface 254 allows data to be received from and sent to the radio 260. For data received from the radio 260 (e.g., inbound data), the radio interface 254 provides the data to the processing module 250 for further processing and/or routing to the output interface 256. The output interface 256 provides connectivity to one or more output display devices such as a display, monitor, speakers, etc. such that the received data may be displayed. The radio interface 254 also provides data from the processing module 250 to the radio 260. The processing module 250 may receive the outbound data from one or more input devices such as a keyboard, keypad, microphone, etc. via the input interface 258 or generate the data itself.

Radio 260 includes an interface 262, a baseband processing module 264, memory 266, radio frequency (RF) transmitters (TXs) 268-272, a transmit/receive (T/R) module 274, antennae 282-286, RF receivers (RXs) 276-280, and a local oscillation module 201. The baseband processing module 264, in combination with operational instructions stored in memory 266, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion.

In operation, the radio 260 receives outbound data 288 from the device via the interface 262. The baseband processing module 264 receives the outbound data 288 and, based on a mode selection signal 202, produces one or more outbound symbol streams 290. The mode selection signal 202 will indicate a particular mode as are illustrated in the mode selection tables as may be understood by the reader. For example, the mode selection signal 202 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. Also, in such mode selection tables, a code rate is supplied as well as number of coded bits per subcarrier (NBPSC), coded bits per OFDM symbol (NCBPS), data bits per OFDM symbol (NDBPS). The mode selection signal may also indicate a particular channelization for the corresponding mode which for the information in one of the mode selection tables with reference to another of the mode selection tables. It is of course noted that other types of channels, having different bandwidths, may be employed in other embodiments.

The baseband processing module 264, based on the mode selection signal 202 produces the one or more outbound symbol streams 290 from the output data 288. For example, if the mode selection signal 202 indicates that a single transmit antenna is being utilized for the particular mode that has been selected, the baseband processing module 264 will produce a single outbound symbol stream 290. Alternatively, if the mode selection signal indicates 2, 3 or 4 antennae, the baseband processing module 264 will produce 2, 3 or 4 outbound symbol streams 290 corresponding to the number of antennae from the output data 288.

Depending on the number of outbound streams 290 produced by the baseband processing module 264, a corresponding number of the RF transmitters 268-272 will be enabled to convert the outbound symbol streams 290 into outbound RF signals 292. The transmit/receive module 274 receives the outbound RF signals 292 and provides each outbound RF signal to a corresponding antenna 282-286.

When the radio 260 is in the receive mode, the transmit/receive module 274 receives one or more inbound RF signals via the antennae 282-286. The T/R module 274 provides the inbound RF signals 294 to one or more RF receivers 276-280. The RF receiver 276-280 converts the inbound RF signals 294 into a corresponding number of inbound symbol streams 296. The number of inbound symbol streams 296 will correspond to the particular mode in which the data was received. The baseband processing module 264 receives the inbound symbol streams 296 and converts them into inbound data 298, which is provided to the devices 218-232 via the interface 262.

In one embodiment of radio 260 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the baseband processing module 264, is operably coupled to convert the MPDU into a PLCP Protocol Data Unit (PPDU) in accordance with the WLAN protocol. The Physical Medium Dependent (PMD) module is operably coupled to convert the PPDU into radio frequency (RF) signals in accordance with one of the operating modes of the WLAN protocol, wherein the operating modes includes multiple input and multiple output combinations.

An embodiment of the Physical Medium Dependent (PMD) module includes an error protection module, a demultiplexing module, and direction conversion modules. The error protection module, which may be implemented in the baseband processing module 264, is operably coupled to restructure a PPDU (PLCP (Physical Layer Convergence Procedure) Protocol Data Unit) to reduce transmission errors producing error protected data. The demultiplexing module is operably coupled to divide the error protected data into error protected data streams. The direct conversion modules are operably coupled to convert the error protected data streams into radio frequency (RF) signals.

As one of average skill in the art will appreciate, the wireless communication device of FIG. 2 may be implemented using one or more integrated circuits in accordance with any desired configuration or combination or components, modules, etc. within one or more integrated circuits.

A device implemented using one or more embodiments of this diagram may perform these selective relaying and acknowledgment operations as described herein. A relay wireless communication device receives a frame from a source wireless communication device.

The wireless communication device 200 includes a communication interface configured to receive frames from a source wireless communication device, and also to transmit frames to a destination wireless communication device. Also, the wireless communication device 200 includes at least one processor (e.g., baseband processing module 264) to process received frames and to generate frames for transmission based on any of various modes including implicit acknowledgement mode, explicit acknowledgement mode, and second explicit acknowledgement mode.

Appropriate setting of a relayed frame bit within various frames can indicate different things, including implicit acknowledgement capability of a source as well as an indicator of control of the TXOP (e.g., whether it be by the source or the relay).

Figure 3:
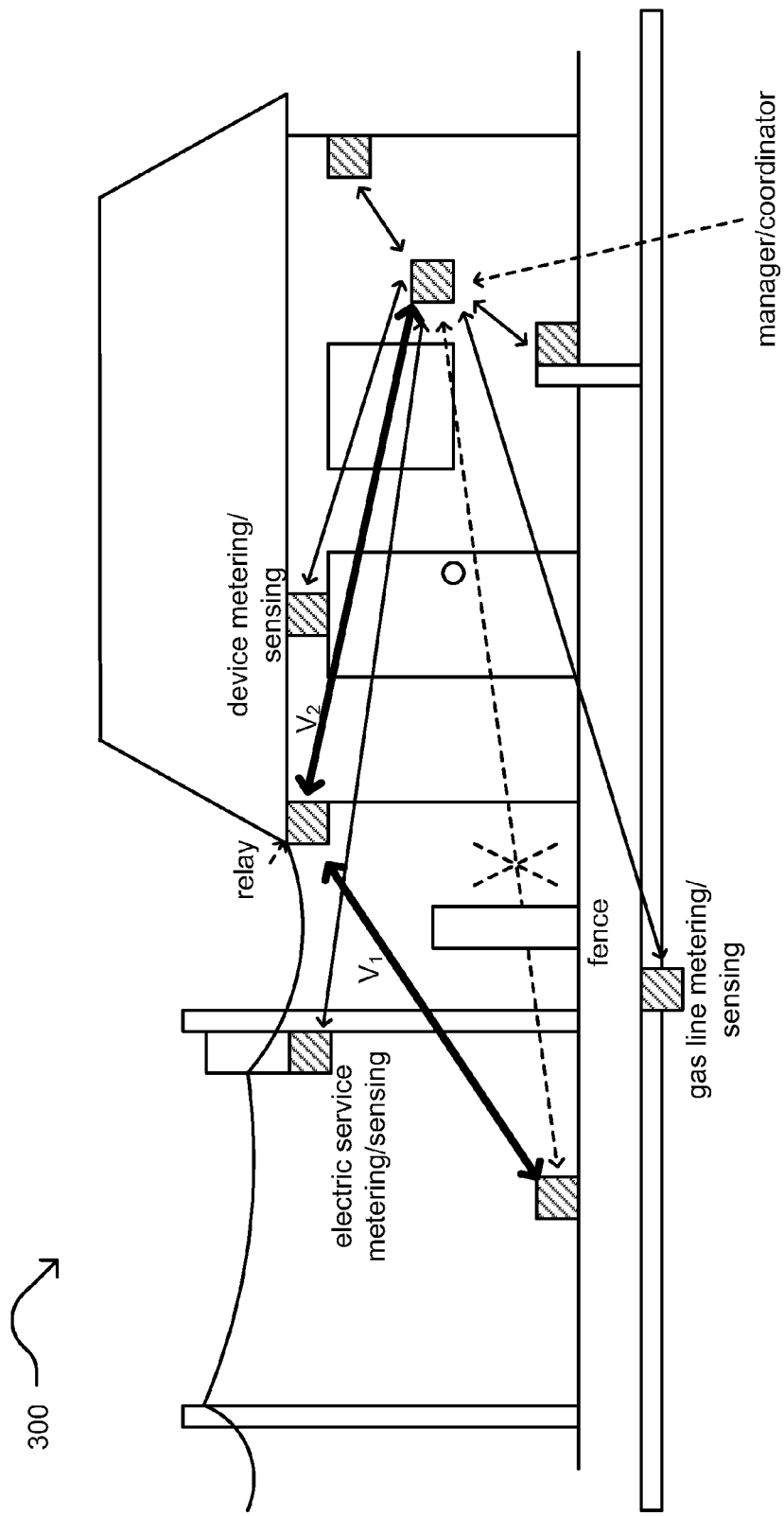
FIG. 3 is a diagram illustrating an embodiment of a number of wireless communication devices, some operative as smart meter stations (SMSTAs).

FIG. 3 is a diagram illustrating an embodiment 300 of a number of wireless communication devices, some operative as smart meter stations (SMSTAs), implemented in various locations in an environment including a building or structure. Some wireless communication devices may be implemented to support communications associated with monitoring and/or sensing of any of a variety of different conditions, parameters, etc. Such wireless communication devices provide such sensed/monitored information to one or more other wireless communication devices via relaying as described herein.

For example, in some instances, a wireless communication device may be implemented as a smart meter station (SMSTA). A SMSTA has communication functionality similar to a wireless station (STA) and is also operative to perform communication of monitoring and/or sensing related information. In certain applications, such devices may operate only very rarely. For example, when compared to the periods of time in which such a device is in power savings mode (e.g., a sleep mode, a reduced functionality operational mode a lowered power operational mode, etc.), the operational periods of time may be miniscule in comparison (e.g., only a few percentage of the periods of time in which the device is in such a power savings mode).

An SMSTA may awaken from such a power savings mode only to perform certain operations. For example, such a device may awaken from such a power savings mode to perform sensing and/or measurement of one or more parameters, conditions, constraints, etc. During such an operational period (e.g., in which the device is not in a power savings mode), the device may also perform transmission of such information to another wireless communication device (e.g., an access point (AP), another SMSTA, a wireless station (STA), or such an SMSTA or STA operating as an AP, etc.).

It is noted that such a device may enter into an operational mode for performing sensing and/or monitoring at a frequency that is different than (e.g., greater than) the frequency at which the device enters into an operational mode for performing transmissions. For example, such a device may awaken a certain number of times to make successive respective sensing and/or monitoring operations, and such data as is acquired during those operations may be stored (e.g., in a memory storage component within the device), and during a subsequent operational mode dedicated for transmission of the data, multiple data portions corresponding to multiple respective sensing and/or monitoring operations may be transmitted during that operational mode dedicated for transmission of the data.

In this diagram, multiple respective wireless communication devices are implemented to forward information related to monitoring and/or sensing to one particular wireless communication device that may be operating as a manager, coordinator, etc. such as may be implemented by an access point (AP) or a wireless station (STA) operating as an AP. Generally speaking, such wireless communication devices may be implemented to perform any of a number of data forwarding, monitoring and/or sensing operations. For example, in the context of a building or structure, there may be a number of services that are provided to that building or structure, including natural gas service, electrical service, television service, Internet service, etc. Alternatively, different respective monitors and/or sensors may be implemented throughout the environment to perform monitoring and/or sensing related to parameters not specifically related to services. As some examples, motion detection, door ajar detection, temperature measurement (and/or other atmospheric and/or environmental measurements), etc. may be performed by different respective monitors and/or sensors implemented in various locations and for various purposes.

Different respective monitors and/or sensors may be implemented to provide information related to such monitoring and/or sensing functions wirelessly to the manager/coordinator wireless communication device. Such information may be provided continuously, sporadically, intermittently, etc. as may be desired in certain applications.

In addition, it is noted that such communications between such a manager/coordinator wireless communication device of the different respective monitors and/or sensors may be cooperative in accordance with such bidirectional communications, in that, the manager/coordinator wireless communication device may direct the respective monitors and/or sensors to perform certain related functions at subsequent times.

As described with other examples or embodiments, communication between the various devices (SMSTAs and manager/coordinators such as APs) may be adversely affected due to fading, distance, interference, weak/inefficient communication link, etc. and/or other impairments. Also, while various forms of signal degradation such as fading and interference may degrade or prohibit communications between the devices, certain physical features (e.g., buildings, fences, hills, etc.) may also degrade or prohibit such communications. In such situations, a given STA or SMSTA may serve as a relay to support communications between any one of the STAs or SMSTAs and another one of them or the manager/coordinator (AP).

A relay operative wireless communication device may be selected using various options. A source may select one of the other devices as a relay. Alternatively, a source could broadcast a frame, and a first responding device may serve as the relay. In even other situations, one of the wireless communication devices could volunteer to serve as relay between a source and destination that cannot acceptably communicate with one another. For example, a SMSTA that is unable to communicate acceptably well with the manager/coordinator wireless communication device may communicate with the manager/coordinator wireless communication device via a relay, as shown by the two hops or communication links to and from the relay.

Referring to the diagram, a relay (e.g., which itself may be a SMSTA) receives a frame from a source (e.g., another SMSTA), interprets one or more of the frame's bit values and selectively operates in a selected mode (e.g., an implicit acknowledgement mode, a first explicit acknowledgement mode, or second explicit acknowledgement mode). In the implicit acknowledgement mode, the relay transmits a relayed frame to the destination (e.g., manager/coordinator or AP), and the source receives acknowledgement implicitly by the relay's transmission of the relayed frame. In the first explicit acknowledgement mode, the relay provides a response frame to the source that indicates the relay also has control of TXOP. In the second explicit acknowledgement mode, the relay provides a response frame to the source, and the source has control of TXOP.

Figure 4B:
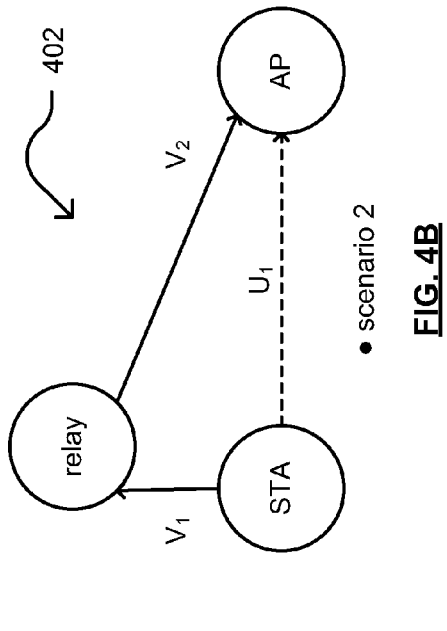
FIG. 4B is a diagram illustrating another example of a wireless communication system including a wireless relay communication device implemented in between 2 other wireless communication devices.
Figure 4D:
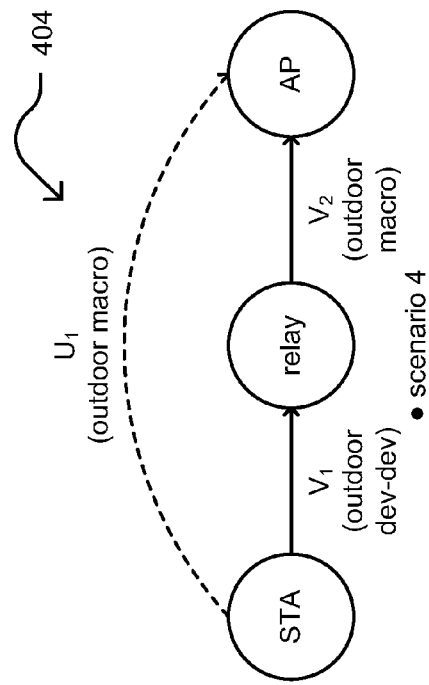
FIG. 4D is a diagram illustrating another example of a wireless communication system including a wireless relay communication device implemented in between 2 other wireless communication devices.
Figure 4A:
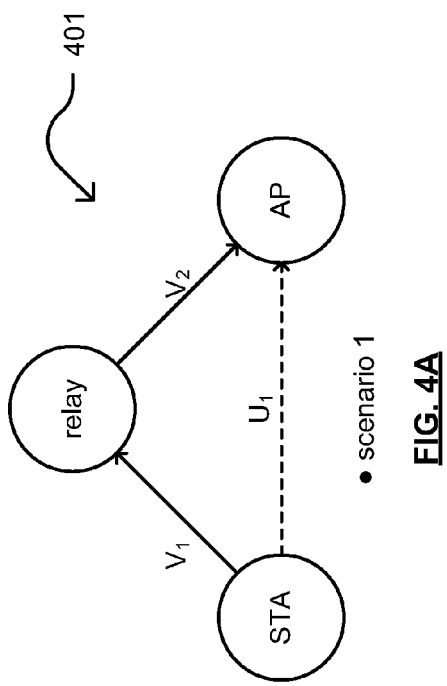
FIG. 4A is a diagram illustrating an example of a wireless communication system including a wireless relay communication device implemented in between 2 other wireless communication devices.

FIG. 4A is a diagram illustrating an example 401 of a wireless communication system including a wireless relay communication device implemented in between 2 other wireless communication devices. As may be seen with respect to scenario 1 of this diagram, a relay (e.g., middling, intervening, etc. wireless communication device) is positioned equal distance between a first wireless communication device (e.g., a wireless station (STA)) and a second wireless communication device) (e.g., an access point (AP)). There are two paths available: Direct and Relay. Comparing the relay path to the direct path, the path via relay needs more frames with shorter PPDU duration for the same number of bytes. This may require separate channel access for next frame transmission over the relay-STA hop. A shorter TX-RX cycle via the relay path allows STA to operate with lesser power consumption.

FIG. 4B is a diagram illustrating another example 402 of a wireless communication system including a wireless relay communication device implemented in between 2 other wireless communication devices. Referring to scenario 2 of this diagram, a relay is positioned relatively closer to a first wireless communication device (e.g., STA) than to a second wireless communication device (e.g., AP). As shown in the diagram, the STA proximity to the Relay permits the use of higher modulation coding set (MCS) and consumes lesser power for hop $V_1$. The Relay requires separate channel access for next hop. The Relay may be another sensor on wall-power, and path loss is outdoor device-device.

Figure 4C:
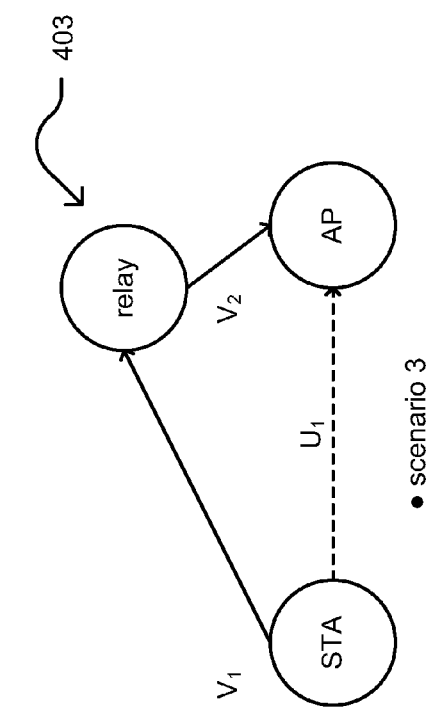
FIG. 4C is a diagram illustrating another example of a wireless communication system including a wireless relay communication device implemented in between 2 other wireless communication devices.

FIG. 4C is a diagram illustrating another example 403 of a wireless communication system including a wireless relay communication device implemented in between 2 other wireless communication devices. Referring to scenario 3 of this diagram, a relay is positioned relatively closer to a first wireless communication device (e.g., AP) and away from a second wireless communication device (STA). The Relay path may be suboptimal than a direct path between the AP and the STA (e.g., relay selection=path selection). If Relay is another sensor and STA-Relay hop is outdoor device-device path loss, then Relay may not be reachable by STA with the same MCSs.

FIG. 4D is a diagram illustrating another example 404 of a wireless communication system including a wireless relay communication device implemented in between 2 other wireless communication devices. Referring to scenario 4 of this diagram, in a situation where the STA-Relay-AP may be arranged in a straight line, and when the STA sends one uplink DATA, then the following observations may be made.

Total Medium Time: PPDU($V_1$)+ACK($V_1$)+PPDU($V_2$)+ACK($V_2$)+3×SIFS

STA ON Time: PPDU($V_1$)+ACK($V_1$)+SIFS

STA-Relay Factor: ratio of Distance ($V_1$) to Distance ($U_1$) (e.g., Distance ($V_1$)/Distance ($U_1$))

In the above observations, PPDU time is based on PLCP Protocol Data Unit (PPDU) transmission time. ACK time is based on acknowledgement (ACK) transmission time. SIFS time shown below is based on short interframe space (SIFS). The variable, $V_1$ and $V_2$, correspond to the respective distances indicated in the diagram and between the communication devices.

Generally speaking, a relay forwards information received from a source onto a destination. In some embodiments, no more than two hops or communication links are made to forward information from a source to a destination via a relay. Appropriate signaling within the various communications between the originating device, the relay device, and the destination device ensures appropriate coordination and operation.

A relay determines state of a relayed frame bit within a frame received from a source. Based upon the relayed frame bit state, and in some instances state of a more data bit as well, the relay replies to the source with an ACK, BACK, or some other response frame. Alternatively, the relay device forwards at least a portion of information received from the source and onto the destination without a response frame sent to the source. Appropriately setting state or one or more bits in these frames informs not only those specific devices involved in the communication, but also devices that may be listening.

FIG. 5 is a diagram illustrating an embodiment 500 of a frame being communicated between wireless communication devices for relay transmission opportunity (TXOP). TXOP sharing for relaying can be performed to improve the overall performance of the communication system. For example, relaying can assist to minimize power consumption and the number of channel contentions that may be required to support communications between various devices.

Such operations are performed when access to the communication medium (e.g., air, in a wireless communication system context) is available. A time in which relay type communications may be performed may generally be referred to as a relay transmission opportunity (TXOP).

Generally speaking, a frame employed within such wireless communications includes the following basic components: media access control (MAC) header, a variable length frame body, and a frame check sequence (FCS). In certain embodiments, the MAC header includes fields for each of frame control (FC), duration (DUR/ID), address (e.g., receiver and/or transmitter addresses), sequence control information, optional Quality of Service (QoS) Control information (e.g., for QoS data frames only), and HT Control fields (+HTC frames only) (optional fields). Note that such a frame structure is illustrative and an example of such a frame structure, and alternative embodiments of frame structures may also be employed.

Referring to the diagram, the Frame Control (FC) field in a short MAC long header (e.g., such as which may be included within signals transmitted between devices) uses a reserved bit in the Frame Control field for the purpose of indicating if a frame is relayed within a TXOP, depicted as "Relayed Frame".

As may be seen within this diagram showing Frame Control Present field, 1-bit (e.g., such as used from 3 available Reserved bits) is employed o indicate if a frame is relayed within a TXOP. If this bit is set in an initiating frame, then it is a capability indication for implicit acknowledgement (ACK) signaling.

Alternatively, if this bit is set in a responding frame (e.g. ACK, clear to send (CTS), etc.), then it indicates relay shall share the TXOP and continue to transmit the frame over the next hop after SIFS. The choice of which ACK procedure to use is decided by the Relay.

Also, consideration and determination of acknowledgement indicator bits and also a relayed frame bit direct the operation of the various devices within the system. That is to say, determination of a number of different considerations directs the manner of operation of the devices (e.g., whether or not the bits are included within an initiating responding frame, the particular values of the acknowledgement indicator bits (AckInd), relayed frame bit (RelayedFrame), more data bit, etc.).

Various timing diagrams are presented below that show examples of signaling that may be performed between various devices within a wireless communication system. For illustration, three respective devices are employed, namely, an access point (AP) (or a wireless station (STA) operating as an AP), a relay, and a STA. However, it is noted that any of a number of possible wireless communication devices, such as those described above, may alternatively be employed to perform the operations, signaling, and functions as described herein.

While a relay can operate selectively based on various modes including implicit acknowledgement mode, explicit acknowledgement mode, and second explicit acknowledgement mode, state of the relayed frame bit within a given frame can constrain operational into certain of the modes. For example, within a frame received from a source, the state of the relayed frame bit can operate as a capability indicator such as to indicate whether the source wireless communication device has implicit acknowledgement capability. Within a frame transmitted from a relay, the state of the relayed frame bit can operate as an indicator of control of the TXOP (e.g., whether the relay will take control of the TXOP or if control remains with the source).

Generally, when a relay receives a valid frame (such as from a source) in which the state of a relayed frame bit within the frame indicates the source has implicit acknowledgement capability (e.g., Relayed Frame bit set to 1), the relay may respond with an implicit acknowledgement (ACK) in a next-hop transmission after an SIFS.

Alternatively, the relay may respond with an ACK after SIFS and with state of a relayed frame bit therein set to indicate transmission opportunity (TXOP) control by the relay (e.g., Relayed Frame bit set to 1). The relay then generates a relayed frame (e.g., data or payload of frame received from source with reprogrammed the source and destination address, etc.) based on a first explicit acknowledgement mode. The relay will then continue with a next-hop DATA transmission after SIFS.

In yet another alternative embodiment, the relay may respond with an ACK after SIFS and with state of a relayed frame bit therein set to indicate TXOP control by the source (e.g., Relayed Frame bit set to 0). In this second explicit acknowledgement mode, the relay does not continue to use the remaining TXOP.

With respect to setting the state of the relayed frame bit within a frame (e.g., ACK, DATA frame, etc.), one embodiment operates with a restriction that a relay may set Relayed Frame bit to 1 only if it has received a More Data bit set to 0 (e.g., indicating the source does not have additional data intended for the destination and/or relay).

Figure 6:
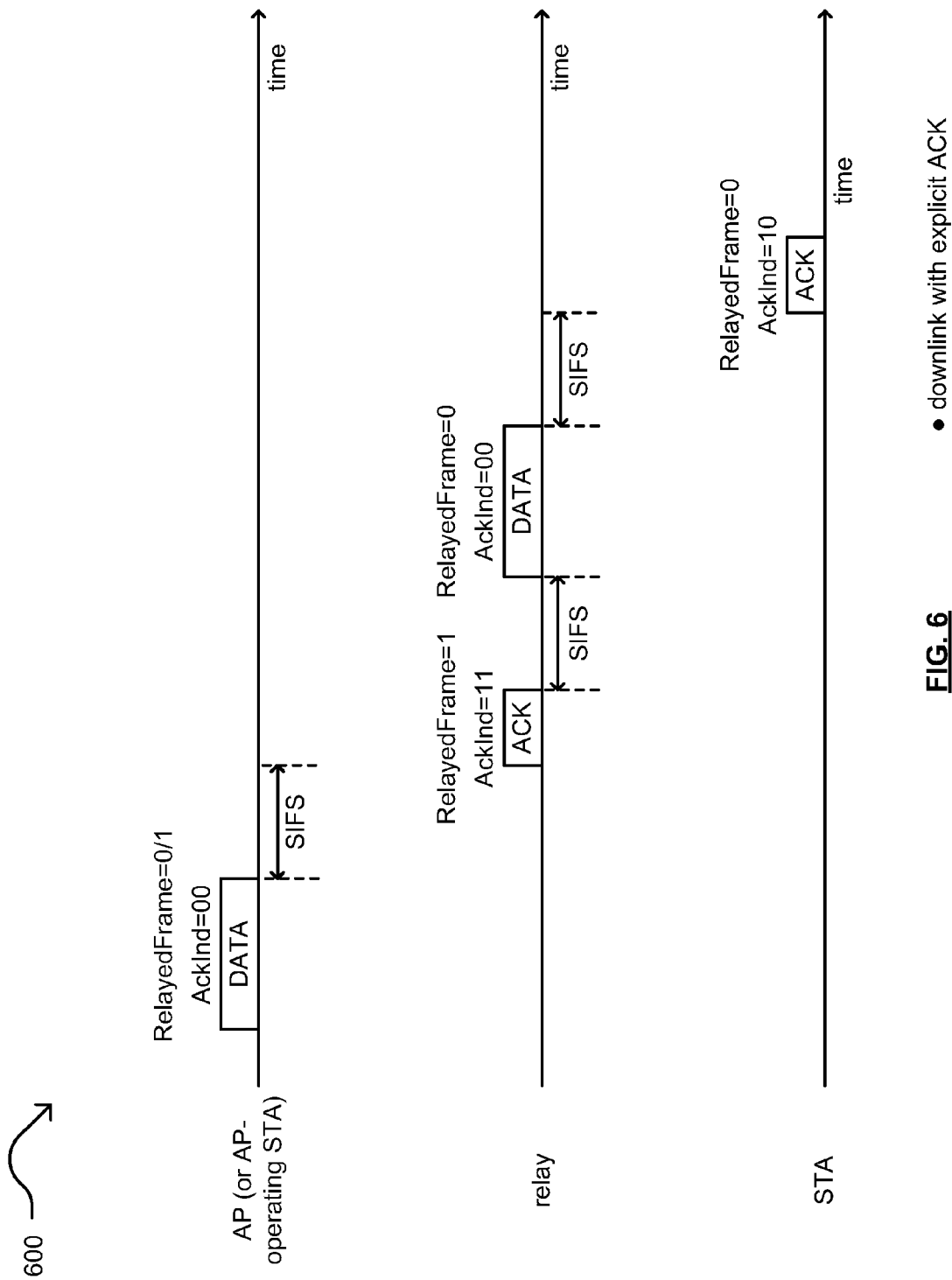
FIG. 6 is a diagram illustrating an example of a timing diagram based on downlink communications with explicit acknowledgement (ACK).

FIG. 6 is a diagram illustrating an example 600 of a timing diagram based on downlink communications with explicit acknowledgement (ACK). The AP sends a downlink data frame with the acknowledgement indicator bits set to a first value (e.g., the particular bits AckInd=00). After the expiration of a short interframe space (SIFS), the relay sends an acknowledgement (ACK) to the AP, and also sets the acknowledgement indicator bits to a second value (e.g., AckInd=11) as well as sets the relayed frame bit to a first value (e.g., RelayedFrame=1).

After the AP receives the ACK, the AP removes the frame from the buffer, and then defers for a period of time before the next event. This period of time is equal to MAX_PPDU+ACK+2×SIFS in one example.

After the expiration of another SIFS, the relay sends data on to the station (STA) using a different modulation coding set (MCS) than that which is used within the original downlink data frame sent from the AP and received by the relay. Also, the relay operates to set the acknowledgement indicator bits set to the first value (e.g., AckInd=00) and the relayed frame bit to a second value (e.g., RelayedFrame=0). The relay then buffers the frame until it successfully delivers it to the STA or has reached a limit of retries. The STA will respond with an ACK upon successful receipt of the signal from the relay.

Figure 7:
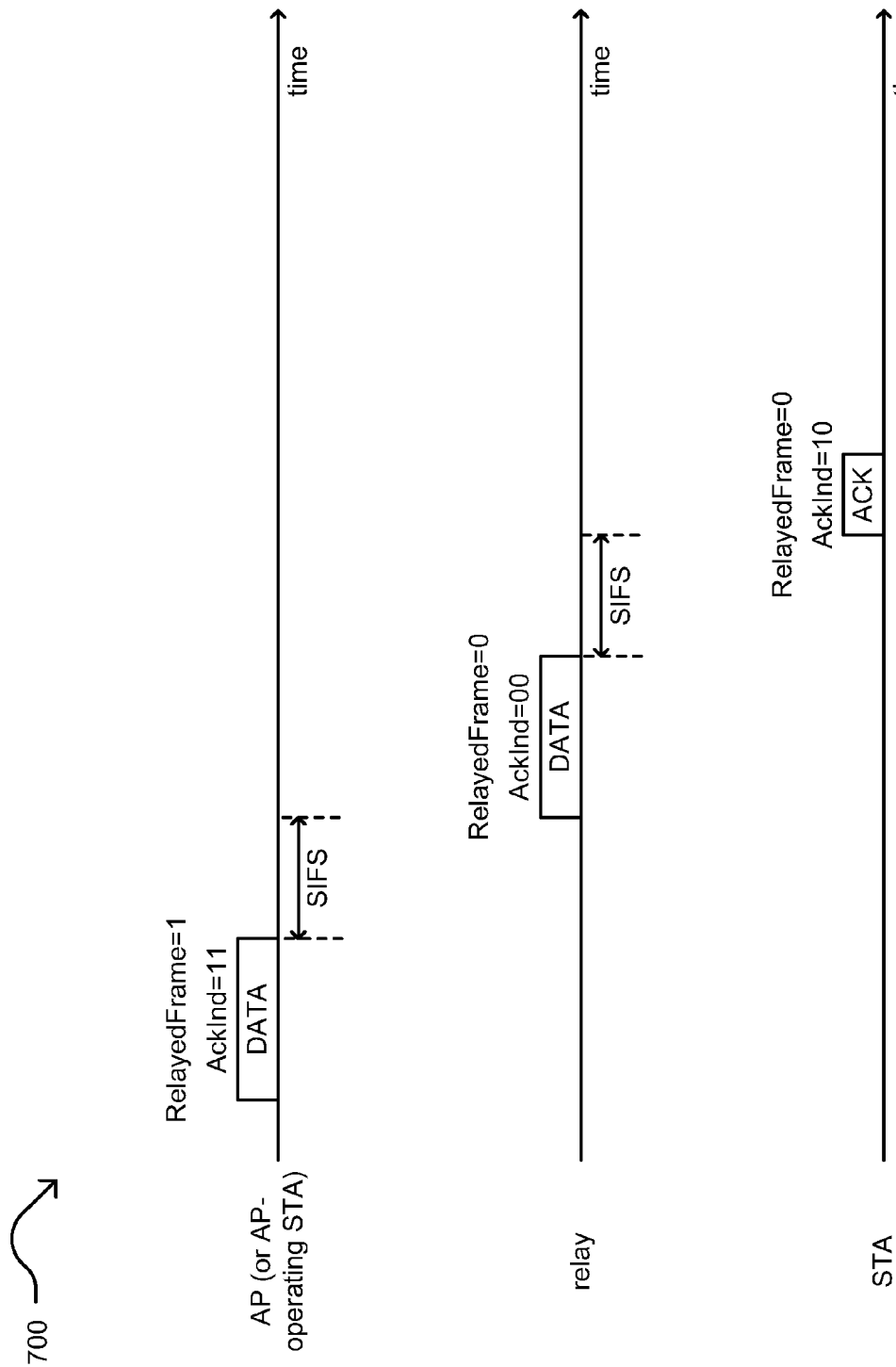
FIG. 7 is a diagram illustrating an example of a timing diagram based on downlink communications with implicit ACK.

FIG. 7 is a diagram illustrating an example 700 of a timing diagram based on downlink communications with implicit ACK. The AP sends a downlink data frame with the acknowledgement indicator bits set to a first value (e.g., the particular bits AckInd=00) and with the relayed frame bit to a first value (e.g., RelayedFrame=1). After the expiration of a SIFS, the relay sends data on to the station (STA) using a different MCS than that which is used within the original downlink data frame sent from the AP and received by the relay.

Also, within the SIFS time, the AP receives a physical layer (PHY) signal field (SIG) with the respective acknowledgement indicator bits set to the first value (e.g., AckInd=00), and the AP then checks the next-hop PAID value within the PHY SIG.

The relay then buffers the frame until it successfully delivers it to the STA or has reached a limit of retries. The STA will respond with an ACK upon successful receipt of the signal from the relay.

The following two diagrams operate very similarly as the prior two diagrams, with at least one difference being that the following two diagrams correspond of uplink (as opposed to downlink) communications.

Figure 8:
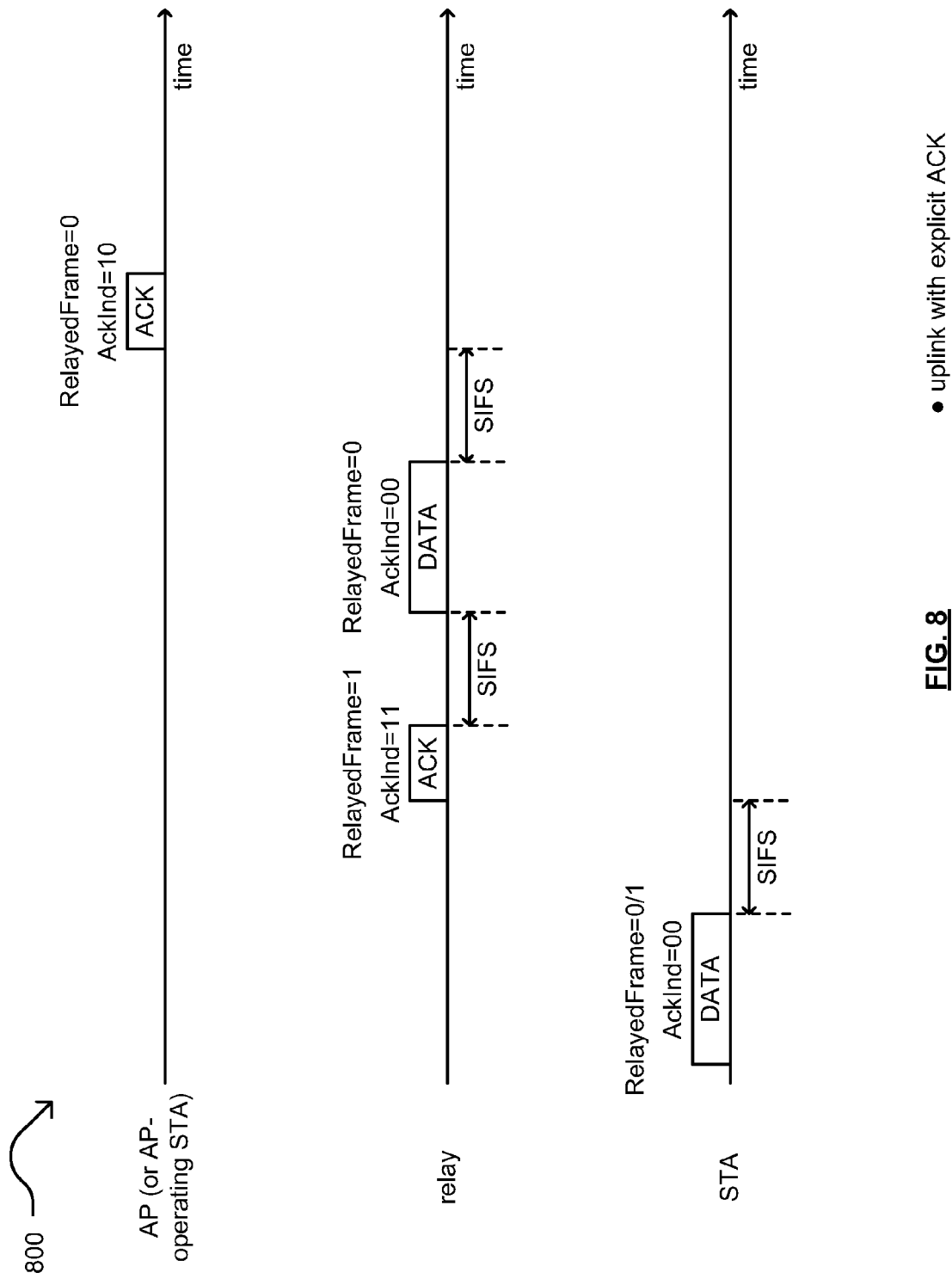
FIG. 8 is a diagram illustrating an example of a timing diagram based on uplink communications with explicit ACK.

FIG. 8 is a diagram illustrating an example 800 of a timing diagram based on uplink communications with explicit ACK. The STA sends a downlink data frame with the acknowledgement indicator bits set to a first value (e.g., the particular bits AckInd=00). After the expiration of a short interframe space (SIFS), the relay sends an acknowledgement (ACK) to the STA, and also sets the acknowledgement indicator bits to a second value (e.g., AckInd=11) as well as sets the relayed frame bit to a first value (e.g., RelayedFrame=1).

After the AP receives the ACK, the AP removes the frame from the buffer, and then defers for a period of time before the next event. This period of time is equal to MAX_PPDU+ACK+2×SIFS in one example.

After the expiration of another SIFS, the relay sends data on to the AP using a different MCS than that which is used within the original downlink data frame sent from the STA and received by the relay. Also, the relay operates to set the acknowledgement indicator bits set to the first value (e.g., AckInd=00) and the relayed frame bit to a second value (e.g., RelayedFrame=0). The relay then buffers the frame until it successfully delivers it to the AP or has reached a limit of retries. The AP will respond with an ACK upon successful receipt of the signal from the relay.

Figure 9:
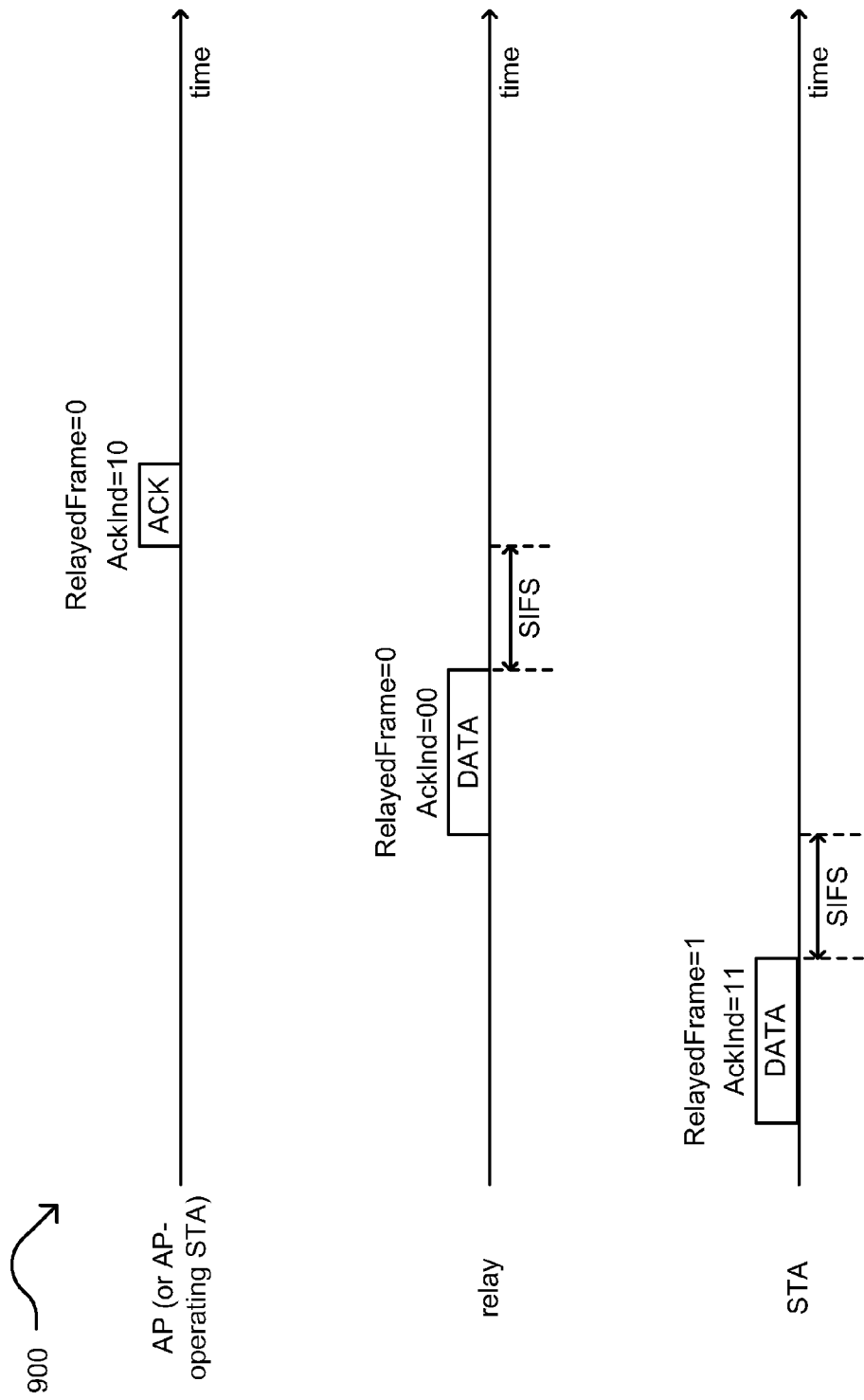
FIG. 9 is a diagram illustrating an example of a timing diagram based on uplink communications with implicit ACK.

FIG. 9 is a diagram illustrating an example 900 of a timing diagram based on uplink communications with implicit ACK. The STA sends a downlink data frame with the acknowledgement indicator bits set to a first value (e.g., the particular bits AckInd=00) and with the relayed frame bit to a first value (e.g., RelayedFrame=1). After the expiration of a SIFS, the relay sends data on to the AP using a different MCS than that which is used within the original downlink data frame sent from the STA and received by the relay.

Also, within the SIFS time, the AP receives a physical layer (PHY) signal field (SIG) with the respective acknowledgement indicator bits set to the first value (e.g., AckInd=00), and the STA then checks the next-hop PAID value within the PHY SIG.

The relay then buffers the frame until it successfully delivers it to the AP or has reached a limit of retries. The AP will respond with an ACK upon successful receipt of the signal from the relay.

Figure 10:
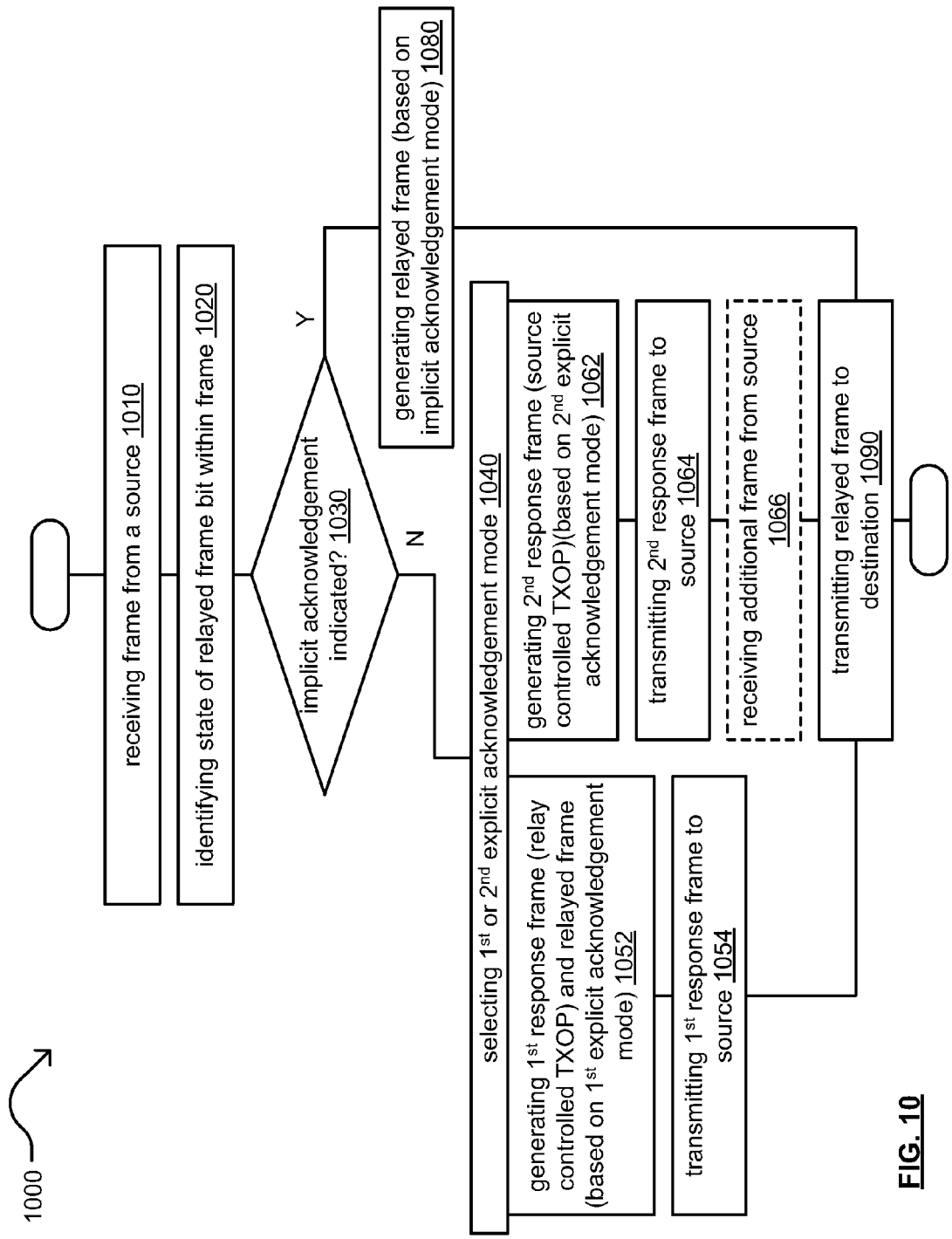
FIG. 10 is a diagram illustrating an embodiment of a method for execution by one or more wireless communication devices.

FIG. 10 is a diagram illustrating an embodiment of a method 1000 for execution by one or more wireless communication devices. Via at least one communication interface of the relay wireless communication device, the method begins by receiving a signal that includes a first frame from a first wireless communication device, as shown in a block 1010.

The method 1000 operates by receiving a frame from a source wireless communication device, as shown in a block 1010. For example, the wireless communication device can include a communication interface for the receipt and transmission of signals to and from other wireless communication devices.

The method 1000 then continues by determining whether the source wireless communication device has implicit acknowledgement capability based on state of a relayed frame bit within the frame, as shown in a block 1020. If implicit acknowledgement capability is determined (as in the decision block 1030), then the method 1000 then continues by generating the relayed frame based on an implicit acknowledgement mode, as shown in a block 1080. Then, the method 1000 operates by transmitting the relayed frame to the destination, as shown in a block 1090.

Alternatively, if no implicit acknowledgement capability is determined (as in the decision block 1030), the method 1000 can operates using either of two different modes, e.g., a first explicit acknowledgement mode or a second explicit acknowledgement mode. One of these modes may be selected as shown in a block 1040.

When operating using the first explicit acknowledgement mode, the method 1000 operates by generating a first response frame for the source wireless communication device, with state of a relayed frame bit therein set to indicate transmission opportunity (TXOP) control by the wireless communication device, as shown in a block 1052. The method 1000 also operates by generating the relayed frame, as shown in the block 1052. The method 1000 then continues by transmitting the first response frame to the source wireless communication device, as shown in a block 1054. In this operational mode, the method 1000 then operates by transmitting the relayed frame to the destination, as shown in a block 1090.

When operating using the second explicit acknowledgement mode, the method 1000 operates by generating a second response frame for the source wireless communication device, with state of a relayed frame bit therein set to indicate TXOP by the source wireless communication device, as shown in a block 1062. The method 1000 then continues by transmitting the second response frame to the source wireless communication device, as shown in a block 1064. In some instances, the source wireless communication device includes at least one additional frame intended for the destination and/or relay, and the method 1000 operates by receiving at least one additional frame from the source wireless communication device, as shown in a block 1066. In this operational mode, the method 1000 then operates by transmitting the relayed frame to the destination, as shown in a block 1090.

It is noted that the various operations and functions described within various methods herein may be performed within a wireless communication device (e.g., such as by the baseband processing module 64, the processing module 50 as described with reference to FIG. 2) and/or other components therein. Generally, a communication interface and processor in a wireless communication device can perform such operations.

Examples of some components may include one of more baseband processing modules, one or more media access control (MAC) layers, one or more physical layers (PHYs), and/or other components, etc. For example, such a baseband processing module (sometimes in conjunction with a radio, analog front end (AFE), etc.) can generate such signals, frames, etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

The present invention has been described herein with reference to at least one embodiment. Such embodiment(s) of the present invention have been described with the aid of structural components illustrating physical and/or logical components and with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims that follow. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may also be used herein, the terms "processing module," "processing circuit," "processing circuitry," "processing unit" and/or "processor" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a functional block, hardware, and/or software stored on memory for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
    a communication interface configured to:
        receive a frame from a source wireless communication device;
        transmit a relayed frame to a destination wireless communication device; and
        transmit a response frame to the source wireless communication device; and
    a processor configured to:
        determine whether the source wireless communication device has implicit acknowledgement capability based on state of a relayed frame bit within the frame;
        when the source wireless communication device has implicit acknowledgement, generate the relayed frame based on an implicit acknowledgement mode; and
        when the source wireless communication device does not have implicit acknowledgement:
            generate the response frame, with state of a relayed frame bit set to indicate transmission opportunity (TXOP) is controlled by the wireless communication device and generate the relayed frame based on a first explicit acknowledgement mode; or
            generate the response frame, with state of the relayed frame bit set to indicate TXOP is controlled by the source wireless communication device based on a second explicit acknowledgement mode.

2. The wireless communication device of claim 1, wherein the communication interface is further configured to:
    transmit the response frame to the source wireless communication device before transmitting the relayed frame to the destination wireless communication device when the wireless communication device is in the first explicit acknowledgement mode; and
    transmit the response frame to the source wireless communication device and receive an additional frame from the source wireless communication device before transmitting the relayed frame to the destination wireless communication device when the wireless communication device is in the second explicit acknowledgement mode.

3. The wireless communication device of claim 1, wherein the communication interface is further configured to transmit the relayed frame with state of a relayed frame bit set to indicate TXOP is controlled by the source wireless communication device.

4. The wireless communication device of claim 1, wherein the communication interface is further configured to receive a third response frame from the destination wireless communication device to indicate successful transmission of the relayed frame to the destination wireless communication device.

5. The wireless communication device of claim 1, wherein, when state of a more data bit within the frame indicates the source wireless communication device has an additional frame intended for the destination wireless communication device, the communication interface is further configured, in the second explicit acknowledgement mode, to receive the additional frame from the source wireless communication device.

6. The wireless communication device of claim 1, wherein the processor is further configured to select the implicit acknowledgement mode, the first explicit acknowledgement mode, or the second explicit acknowledgement mode based on the state of the relayed frame bit and the state of a more data bit within the frame.

7. The wireless communication device of claim 1, wherein the state of the relayed frame bit within the frame indicates whether or not the source wireless communication device has implicit acknowledgement; and
    the state of the relayed frame bit within the response frame indicates whether TXOP is controlled by the wireless communication device or the source wireless communication device.

8. The wireless communication device of claim 1, further comprising:

the source wireless communication device including one of a wireless station (STA) and a smart meter station (SMSTA); and the destination wireless communication device including an access point (AP).

9. A wireless communication device comprising:
a communication interface configured to:
receive a frame from a source wireless communication device;
transmit a relayed frame to a destination wireless communication device; and
transmit a response frame to the source wireless communication device; and
a processor configured to:
determine whether the source wireless communication device has implicit acknowledgement capability based on state of a relayed frame bit within the frame;
when the source wireless communication device has acknowledgement, generate the relayed frame based on an implicit acknowledgement mode; and
determine whether the source wireless communication device has an additional frame intended for the destination wireless communication device based on state of a more data bit within the frame;
when the source wireless communication device does not have implicit acknowledgement and has the additional frame, generate the response frame with state of a relayed frame bit set to indicate transmission opportunity (TXOP) is controlled by the wireless communication device and generate the relayed frame based on a first explicit acknowledgement mode; and
when the source wireless communication device does not have implicit acknowledgement and does not have the additional frame, generate the response frame with state of the relayed frame bit set to indicate TXOP is controlled by the source wireless communication device based on a second explicit acknowledgement mode.

10. The wireless communication device of claim 9, wherein the communication interface is further configured to transmit the relayed frame with state of a relayed frame bit set to indicate TXOP is controlled by the source wireless communication device.

11. The wireless communication device of claim 9, wherein the communication interface is further configured, in the second explicit acknowledgement mode, to receive the additional frame from the source wireless communication device.

12. The wireless communication device of claim 9, wherein the communication interface is further configured to receive a third response frame from the destination wireless communication device to indicate successful transmission of the relayed frame to the destination wireless communication device.

13. The wireless communication device of claim 9, further comprising:
the source wireless communication device including one of a wireless station (STA) and a smart meter station (SMSTA); and
the destination wireless communication device including an access point (AP).

14. A method for execution by a wireless communication device, the method comprising:
operating a communication interface of the wireless communication device to receive a frame from a source wireless communication device, transmit a relayed frame to a destination wireless communication device, and transmit a response frame to the source wireless communication device;
determining whether the source wireless communication device has implicit acknowledgement capability based on state of a relayed frame bit within the frame;
when the source wireless communication device has acknowledgement, generating the relayed frame based on an implicit acknowledgement mode; and
when the source wireless communication device does not have implicit acknowledgement:
generating the response frame, with state of a relayed frame bit set to indicate transmission opportunity (TXOP) is controlled by the wireless communication device and generate the relayed frame based on a first explicit acknowledgement mode; or
generating the response frame, with state of the relayed frame bit set to indicate TXOP is controlled by the source wireless communication device based on a second explicit acknowledgement mode.

15. The method of claim 14 further comprising:
transmitting the response frame to the source wireless communication device before transmitting the relayed frame to the destination wireless communication device when the wireless communication device is in the first explicit acknowledgement mode; and
transmitting the response frame to the source wireless communication device and receiving an additional frame from the source wireless communication device before transmitting the relayed frame to the destination wireless communication device when the wireless communication device is in the second explicit acknowledgement mode.

16. The method of claim 14 further comprising:
transmitting the relayed frame with state of a relayed frame bit set to indicate TXOP is controlled by the source wireless communication device.

17. The method of claim 14 further comprising:
receiving a third response frame from the destination wireless communication device to indicate successful transmission of the relayed frame to the destination wireless communication device.

18. The method of claim 14 further comprising:
if state of a more data bit within the frame indicates the source wireless communication device has an additional frame intended for the wireless communication device, generating the second response frame based on the second explicit acknowledgement mode;
transmitting the second response frame to the source wireless communication device;
receiving the additional frame from the source wireless communication device; and
transmitting the relayed frame to the destination wireless communication device.

19. The method of claim 14, wherein the state of the relayed frame bit within the frame indicates whether or not the source wireless communication device has implicit acknowledgement; and
the state of the relayed frame bit within the response frame indicates whether TXOP is controlled by the wireless communication device or the source wireless communication device.

20. The method of claim 14, wherein the source wireless communication device including one of a wireless station (STA) and a smart meter station (SMSTA), and the destination wireless communication device including an access point (AP).

\* \* \* \* \*